UNITED STATES PATENT OFFICE.

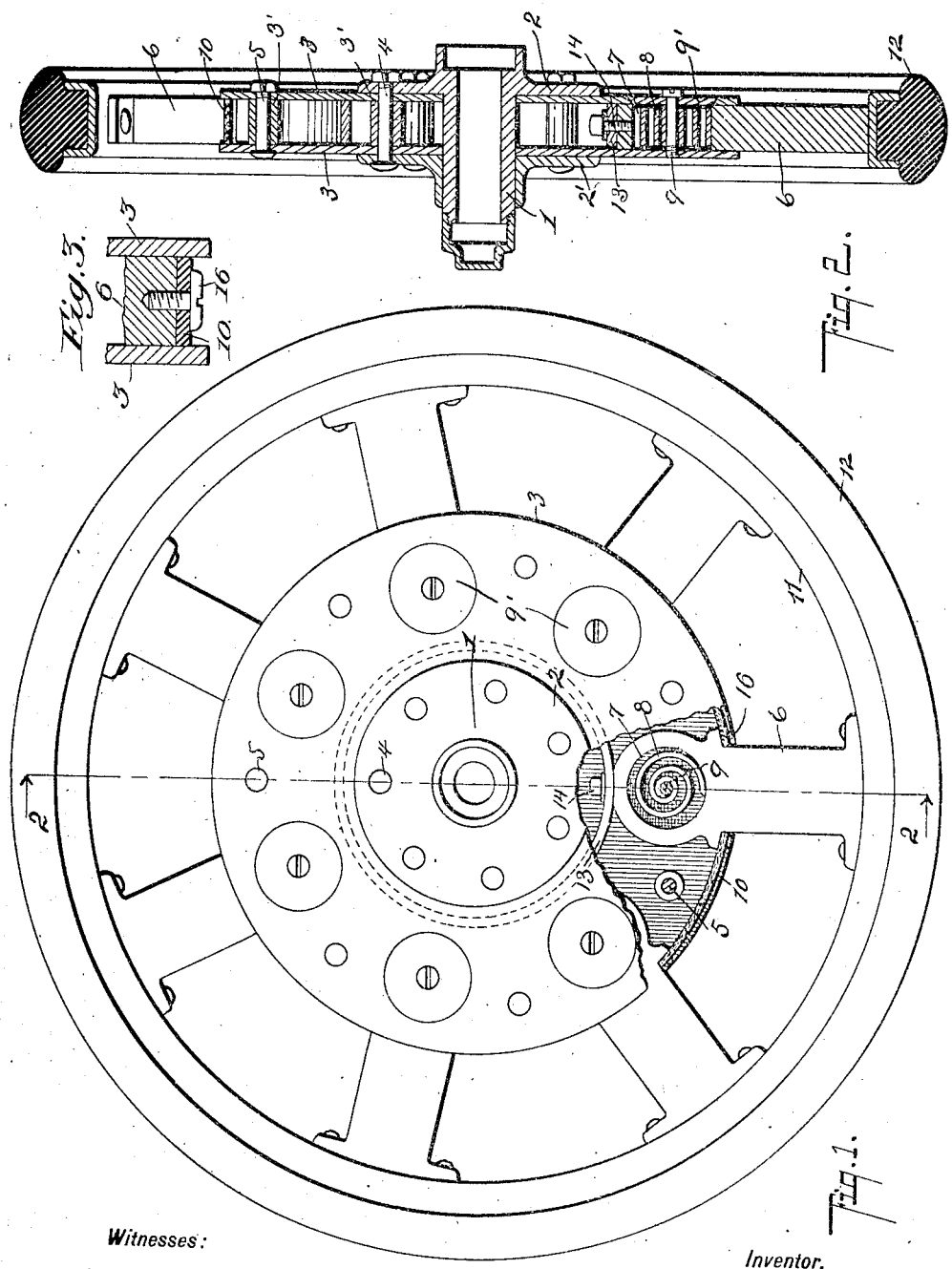

DANIEL WARNER, OF BRONSON, MICHIGAN, ASSIGNOR OF ONE-SIXTH TO FRANK A. ECKLER, OF MENDON, NEW YORK, AND ONE-THIRD TO JOHN N. NEAL, OF COLDWATER, MICHIGAN.

SPRING-WHEEL.

No. 920,226.  Specification of Letters Patent.  Patented May 4, 1909.

Application filed June 7, 1907. Serial No. 377,772.

*To all whom it may concern:*

Be it known that I, DANIEL WARNER, a citizen of the United States, residing at Bronson, in the county of Branch, State of Michigan, have invented certain new and useful Improvements in Spring-Wheels, of which the following is a specification.

This invention relates to improvements in spring wheels.

The objects of this invention are, first, to provide an improved spring wheel in which the elasticity of the spring members remains constant; that is, one in which it is not varied by the relative position of the springs in the wheel as the wheel revolves. Second, to provide an improved spring wheel in which the spring members are so formed and arranged relative to the other parts of the wheel that each spring carries its share of the load, no matter what its relative position in the wheel may be. Third, to provide an improved spring wheel adapted for use on motor vehicles, which is strong and durable, and at the same time resilient, and one which is economical to produce. Fourth, to provide an improved spring wheel in which any spring can be quickly and readily removed, and another spring inserted, should occasion require, without disturbing the other parts of the wheel or without changing the tension of the wheel.

Further objects, and objects relating to details of construction, will definitely appear from the detailed description to follow.

The objects of this invention are accomplished by the devices and means described in the following specification.

The invention is clearly defined and pointed out in the claims.

A structure embodying the features of this invention is clearly illustrated in the accompanying drawing, forming a part of this specification, in which, Figure 1 is a side elevation of a structure embodying the features of this invention, portions being broken away to show the arrangement of the parts. Fig. 2 is a vertical central section, taken on a line corresponding to line 2—2 of Fig. 1, looking in the direction of the little arrows at the ends of the section line. Fig. 3 is an enlarged detail section showing the relation of the inner ends of the spokes and of the hub flanges and the guard plates carried by the spokes.

In the drawing, similar numerals of reference refer to similar parts throughout the several views.

Referring to the drawing, the hub 1 of the structure herein illustrated, embodying the invention, is made of metal and is preferably provided with an integral flange at one end and a removable flange at the other. These flanges are preferably made up of the flange members 2 and 2', the flange member 2' being the removable member, and the disk-like flange plates 3, which are arranged upon the hub between the flange members 2—2'. The removable flange member 2' is sleeved upon the hub, as clearly appears in Fig. 2. The flange plates 3 are spaced by a plurality of spacing members 3', the parts being clamped together by the bolts 4 and 5, the bolts 4 being arranged through the flange members 2—2' and the flange plates, and the bolts 5 being arranged through the flange plates at their outer edges. The spacing members 3' are sleeved upon the clamping bolts whereby the parts are held in position. This rigidly secures the flange members 2—2' and 3 together forming, in effect, when the parts are assembled, a rigid construction. One of the hub-plates is provided with a plurality of openings which are closed by the caps 9'.

The rim 11, which may be of any desired form, is preferably a channeled rim, having a suitable cushioned tire 12 therein.

The spokes 6 are rigidly secured to the rim with their inner ends arranged between the hub-plates 3. On the inner ends of the spokes are transverse openings 7 adapted to receive the spirally-coiled springs 8. These springs are secured to the plates 3 by means of the bolts 9, which are arranged to engage the central coils of the springs, as clearly appears from the drawing. The bolts are also preferably adapted to secure the caps 9' in place. When these caps are removed, the springs 8 may be readily slipped out of the pockets in the spokes.

Between the spokes are arranged the guards 10. These guards are carried by the spokes, the spokes being provided with projecting lugs to which they are secured by means of screws 16. The spokes are all preferably connected by a ring 13, which is arranged between the plates 3 and connected to the inner ends of the spokes, preferably by the screws 14.

By arranging and supporting the springs as illustrated and described, the load on the wheels is at all times equally distributed on all of the springs. The rim is yieldingly supported, and at the same time, the lateral movement thereof is effectively prevented.

The wheels, embodying this invention, are particularly desirable for use on motor vehicles, as the necessity for pneumatic tires is obviated, while the wheels are capable of carrying very heavy loads and are very resilient and well adapted to absorb the jars and shocks of all kinds and carry the vehicle with a minimum amount of vibration.

I have illustrated and described my improved wheel in detail in the form preferred on account of the structural simplicity and convenience in assembling the parts, and also the facility with which the springs may be readily removed in case of injury thereto. I am, however, aware that it is capable of considerable variation in details of construction without departing from my invention, and I desire to be understood as claiming the same specifically as illustrated, as well as broadly.

Having thus described my invention, what I claim as new and desire to secure by Letters Patent is:

1. In a spring wheel, the combination with a hub, having a fixed flange and a removable flange, said flanges comprising the flange members 2—2', and disk-like flange plates 3, one of said flange plates having a plurality of openings therein; caps for said openings in said flange plates; a rim; spokes having transverse openings at their inner ends adapted to serve as spring pockets secured to said rim, the inner ends of said spokes being arranged between said flange plates; and spring connections for said spokes to said hub adapted to be inserted or removed through the said openings in said flange plates.

2. In a spring wheel, the combination with a hub, of a pair of flanges secured thereto, one of said flanges having a plurality of openings therein; caps for said openings in said flanges; a rim; spokes having transverse openings at their inner ends adapted to serve as spring pockets, secured to said rim, the inner ends of said spokes being arranged between said flanges; spiral springs arranged in said pockets in said spokes; bolts arranged to engage the central coils of said springs and retain said caps for the openings in said flanges in position; and guards arranged between said spokes and flanges.

3. In a spring wheel, the combination with a hub, of a pair of flanges secured thereto, one of said flanges having a plurality of openings therein; caps for said openings in said flanges; a rim; spokes having transverse openings at their inner ends adapted to serve as spring pockets, secured to said rim, the inner ends of said spokes being arranged between said flanges; spiral springs arranged in said pockets in said spokes; and bolts arranged to engage the central coils of said springs and retain said caps for the openings in said flanges in position.

4. In a spring wheel, the combination with a hub comprising a pair of flanges, a rim, spokes rigidly secured to said rim the inner ends of said spokes being fitted between said flanges to reciprocate between the same so that they are supported against lateral movement thereby, said spokes having spring pockets in their inner ends, spirally coiled springs arranged in said pockets, the outer coils of said springs being secured to said spokes and their inner coils being secured to said flanges by bolts arranged therethrough, connections for the inner ends of said spokes whereby they are secured to move in unison, and guard members carried by said spokes, said guard members being fitted to reciprocate with said spokes between said hub flanges and lying normally at the periphery thereof.

5. In a spring wheel, the combination with a hub comprising a pair of flanges, a rim, spokes rigidly secured to said rim the inner ends of said spokes being fitted between said flanges to reciprocate between the same so that they are supported against lateral movement thereby, said spokes having spring pockets in their inner ends, spirally coiled springs arranged in said pockets, the outer coils of said springs being secured to said spokes and their inner coils being secured to said flanges by bolts arranged therethrough, and guard members carried by said spokes, said guard members being fitted to reciprocate with said spokes between said hub flanges and lying normally at the periphery thereof.

In witness whereof, I have hereunto set my hand and seal in the presence of two witnesses.

DANIEL WARNER. [L. S.]

Witnesses:
A. J. ADAMS,
OTIS A. EARL.